United States Patent
Jiang et al.

(10) Patent No.: US 11,688,098 B2
(45) Date of Patent: Jun. 27, 2023

(54) METHOD AND SYSTEM FOR HAND POSE RECOGNITION, DEVICE AND STORAGE MEDIUM

(71) Applicant: National University of Defense Technology, Hunan (CN)

(72) Inventors: Jie Jiang, Hunan (CN); Yang Liu, Hunan (CN); Xianghan Wang, Hunan (CN); Jiahao Sun, Hunan (CN); Junyan Yang, Hunan (CN); Yixiang He, Hunan (CN); Liang Bai, Hunan (CN); Lai Kang, Hunan (CN); Yingmei Wei, Hunan (CN); Yuxiang Xie, Hunan (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 17/902,511

(22) Filed: Sep. 2, 2022

(65) Prior Publication Data

US 2023/0116029 A1    Apr. 13, 2023

(30) Foreign Application Priority Data

Oct. 11, 2021 (CN) .......................... 202111180272.0

(51) Int. Cl.
*G06T 7/73* (2017.01)
*G06V 40/10* (2022.01)
(Continued)

(52) U.S. Cl.
CPC ................ *G06T 7/73* (2017.01); *G06V 10/42* (2022.01); *G06V 10/7715* (2022.01); *G06V 10/82* (2022.01); *G06V 40/11* (2022.01); *G06T 2207/10024* (2013.01); *G06T 2207/10028* (2013.01); *G06T 2207/20081* (2013.01);
(Continued)

(58) Field of Classification Search
CPC ............ G06T 7/72; G06T 2207/10024; G06T 2207/10028; G06T 2207/20081; G06T 2207/20084; G06T 2207/30196; G06V 40/11; G06V 10/7715; G06V 10/42; G06V 10/82

See application file for complete search history.

(56) References Cited

PUBLICATIONS

Ge, Liuhao, et al. "3D Hand Shape and Pose Estimation From a Single RGB Image." 2019 IEEE/CVF Conference on Computer Vision and Pattern Recognition (CVPR). IEEE, 2019. (Year: 2019).*

(Continued)

*Primary Examiner* — Vu Le
*Assistant Examiner* — Tracy Mangialaschi

(57) ABSTRACT

The disclosure relates to a method and a system for hand pose recognition, a device and a storage medium are disclosed in embodiments of the disclosure. The method includes: capturing a RGB image of a hand from a RGB camera and capturing a depth image of the hand from an active depth camera, so as to obtain a hand pose data set according to the RGB image and the depth image; processing the hand pose data set to obtain a 3D joint position, and taking the 3D joint position as a data set for training a software model; extracting the RGB image by a feature extractor based on a depth neural network to obtain a feature map of a hand pose; and processing the feature map according to an attention mechanism to obtain a global feature map of the hand pose.

4 Claims, 4 Drawing Sheets

(51) Int. Cl.
*G06V 10/82* (2022.01)
*G06V 10/77* (2022.01)
*G06V 10/42* (2022.01)

(52) U.S. Cl.
CPC ............... *G06T 2207/20084* (2013.01); *G06T 2207/30196* (2013.01)

(56) References Cited

PUBLICATIONS

Sandler M, Howard A, Zhu M, Zhmoginov A, Chen LC. MobileNetV2: Inverted Residuals and Linear Bottlenecks. arXiv preprint arXiv:1801.04381v4. Mar. 21, 2019. (Year: 2019).*

Ma N, Zhang X, Liu M, Sun J. Activate or Not: Learning Customized Activation. arXiv preprint arXiv:2009.04759v2. Apr. 16, 2021. (Year: 2020).*

Zhang, Ji-kai, et al. "3D Gesture Estimation from RGB Images Based on DB-InterNet." Journal of Computers 32.5 (2021): 1-14. (Year: 2021).*

Ningning Ma et al. "Activate or Not: Learning Customized Activation", The Hong Kong University of Science and Technology, Apr. 16, 2021.

Mark Sandler et al. "MobileNetV2: Inverted Residuals and Linear Bottlenecks", Google Inc., Mar. 21, 2019.

Zequn Qin et al. "FcaNet: Frequency Channel Attention Networks" College of Computer Science, Dec. 22, 2020.

Yinhao Xia "3D Reconstruction of Hand Based on a Single RGB Image" South China University of Technology, Jan. 15, 2020.

\* cited by examiner

METHOD AND SYSTEM FOR HAND POSE RECOGNITION, DEVICE AND STORAGE MEDIUM

CROSS-REFERENCE TO RELATED APPLICATIONS

This application claims priority from the Chinese patent application 202111180272.0 filed Oct. 11, 2021, the content of which is incorporated herein in the entirety by reference.

TECHNICAL FIELD

The disclosure relates to a field of artificial intelligence, in particular to a method and a system for hand pose recognition, a device and a storage medium.

BACKGROUND

With continuous development in this information era, all types of electronic devices equipped with artificial intelligence information systems are integrated into our lives, and demands for human-computer interactions have become increasingly prominent. As basic operations of hand interaction, hand position recognition and pose estimation also have great research value. There are many methods to estimate a hand pose using deep learning. Some of them are methods based on an image together with depth information, some of them are methods directly based on a RGB image, and some of them are methods based on binocular or even multi vision. In these methods, a hand pose estimation method based on a single RGB image has attracted more attention because of its simple implementation, low hardware requirements and ease of popularization.

Regarding estimating a hand pose based on a single RGB image using the deep learning, one of most remarkable methods is the InterNet, in which the hand pose can be accurately estimated by inputting a single labeled RGB image, with a deep neural network feature extractor and with subsequent heat map estimation and position fitting by a fully connected network. This method improves performance of hand pose estimation, and solves problems of interactive hand pose estimation on the STB data set. However, a problem of low recognition accuracy exists in above recognition processes.

SUMMARY

On this basis, it is necessary to provide a method and a system for hand pose recognition, a device and a storage medium in light of above technical problems.

In a first aspect, a method for hand pose recognition is provided in an embodiment of the disclosure, which includes the following steps.

A RGB image of a hand is captured from a RGB camera, a depth image of the hand is captured from an active depth camera, and a hand pose data set is obtained according to the RGB image and the depth image.

The hand pose data set is processed to obtain a 3D joint position, and the 3D joint position is taken as a data set for training a deep neural network model.

The RGB image is extracted by a feature extractor based on a depth neural network to obtain a feature map of a hand pose.

The feature map is processed according to an attention mechanism to obtain a global feature map of the hand pose, and to obtain a recognition result of the hand pose using the global feature map.

Further, a step in which the RGB image is extracted by the feature extractor based on the depth neural network to obtain the feature map of the hand pose includes following content.

An inverted residual module composed of an input layer, a bottleneck layer and an extension layer is added into the feature extractor.

An ACON activation function is added at an end of separable convolution before the inverted residual module.

Degrees of linearity and nonlinearity of an activation function area obtained at a specific network location can be learned by setting a hyperparameter.

Further, a step in which the feature map is processed according to the attention mechanism to obtain the global feature map of the hand pose, and to obtain the recognition result of the hand pose using the global feature map includes following content.

A coordinate attention mechanism module is introduced into the feature extractor, and the feature map is processed according to the coordinate attention mechanism module to improve resolution and information completeness of the feature map.

A multispectral attention mechanism module is introduced into the feature extractor, and effectiveness of network feature extraction is estimated according to the multispectral attention mechanism module in the hand pose.

Further, a step in which the feature map is processed according to the attention mechanism to obtain the global feature map of the hand pose, and to obtain the recognition result of the hand pose using the global feature map includes following content.

An estimated position heat map of the three-dimensional hand pose is obtained according to a processing result of the feature map.

An average-pooled shape of the feature map is adjusted so as to obtain position information of a palm heel node, and then a type of the hand is determined to be a left hand or a right hand.

In another aspect, a system for hand pose recognition is provided in an embodiment of the disclosure, which includes a data set module, an image preprocessing module, a feature extraction module and a feature recognition module.

The data set module is configured to capture a RGB image of a hand from a RGB camera and to capture a depth image of the hand from an active depth camera, so as to obtain a hand pose data set according to the RGB image and the depth image.

The image preprocessing module is configured to process the hand pose data set to obtain a 3D joint position, and to take the 3D joint position as a data set for training a deep neural network model.

The feature extraction module is configured to extract the RGB image by a feature extractor based on a depth neural network to obtain a feature map of a hand pose.

The feature recognition module is configured to process the feature map according to an attention mechanism to obtain a global feature map of the hand pose, and to obtain a recognition result of the hand pose using the global feature map.

Further, the feature map extraction module includes an inverted residual unit configured to:

add an inverted residual module composed of an input layer, a bottleneck layer and an extension layer into the feature extractor;

add an ACON activation function at an end of separable convolution before the inverted residual module; and learn degrees of linearity and nonlinearity of an activation function area obtained at a specific network location by setting a hyperparameter.

Further, the feature map recognition module includes an attention mechanism unit configured to:

introduce a coordinate attention mechanism module into the feature extractor, and process the feature map according to the coordinate attention mechanism module to improve resolution and information completeness of the feature map; and introduce a multispectral attention mechanism module into the feature extractor, and estimate effectiveness of network feature extraction according to the multispectral attention mechanism module in the hand pose.

Further, the feature map recognition module includes a result recognition unit configured to:

obtain an estimated position heat map of the three-dimensional hand pose according to a processing result of the feature map; and adjust an average-pooled shape of the feature map so as to obtain position information of a palm heel node, and then determine a type of the hand to be a left hand or a right hand.

A computer device is further provided in an embodiment of the disclosure, which includes a memory, a processor and a computer program stored on the memory and executable on the processor, and the processor implements following steps when executing the program.

A RGB image of a hand is captured from a RGB camera, a depth image of the hand is captured from an active depth camera, and a hand pose data set is obtained according to the RGB image and the depth image.

The hand pose data set is processed to obtain a 3D joint position, and the 3D joint position is taken as a data set for training a deep neural network model.

The RGB image is extracted by a feature extractor based on a depth neural network to obtain a feature map of a hand pose.

The feature map is processed according to an attention mechanism to obtain a global feature map of the hand pose, and to obtain a recognition result of the hand pose using the global feature map.

A computer-readable storage medium having a computer program stored thereon is provided in an embodiment of the present disclosure. Following steps are implemented when the program is executed by a processor.

A RGB image of a hand is captured from a RGB camera, a depth image of the hand is captured from an active depth camera, and a hand pose data set is obtained according to the RGB image and the depth image.

The hand pose data set is processed to obtain a 3D joint position, and the 3D joint position is taken as a data set for training a deep neural network model.

The RGB image is extracted by a feature extractor based on a depth neural network to obtain a feature map of a hand pose.

The feature map is processed according to an attention mechanism to obtain a global feature map of the hand pose, and to obtain a recognition result of the hand pose using the global feature map.

The disclosure has advantages as follows. A method and a system for hand pose recognition, a device and a storage medium are disclosed in embodiments of the disclosure. In this method, firstly a RGB image of a hand is captured from a RGB camera, a depth image of the hand is captured from an active depth camera, and a hand pose data set is obtained according to the RGB image and the depth image; the hand pose data set is processed to obtain a 3D joint position, and the 3D joint position is taken as a data set for training a deep neural network model; the RGB image is extracted by a feature extractor based on a depth neural network to obtain a feature map of a hand pose; and the feature map is processed according to an attention mechanism to obtain a global feature map of the hand pose, and to obtain a recognition result of the hand pose using the global feature map. The recognition method not only provides good recognition accuracy, but also verifies effectivenesses of the coordinate attention mechanism module and the multispectral attention mechanism module in the feature extractor of the hand pose estimation network. Compared with related art, the coordinate attention mechanism is more excellent in improving the network performance. Regarding data acquisition of hand pose estimation, automatic or semi-automatic methods can be gradually used to replace manual labeling, and more accurate labeling by using a learning model such as the neural network contributes to reducing of workload burden caused by manual labeling.

DETAILED DESCRIPTION

Figure 1:
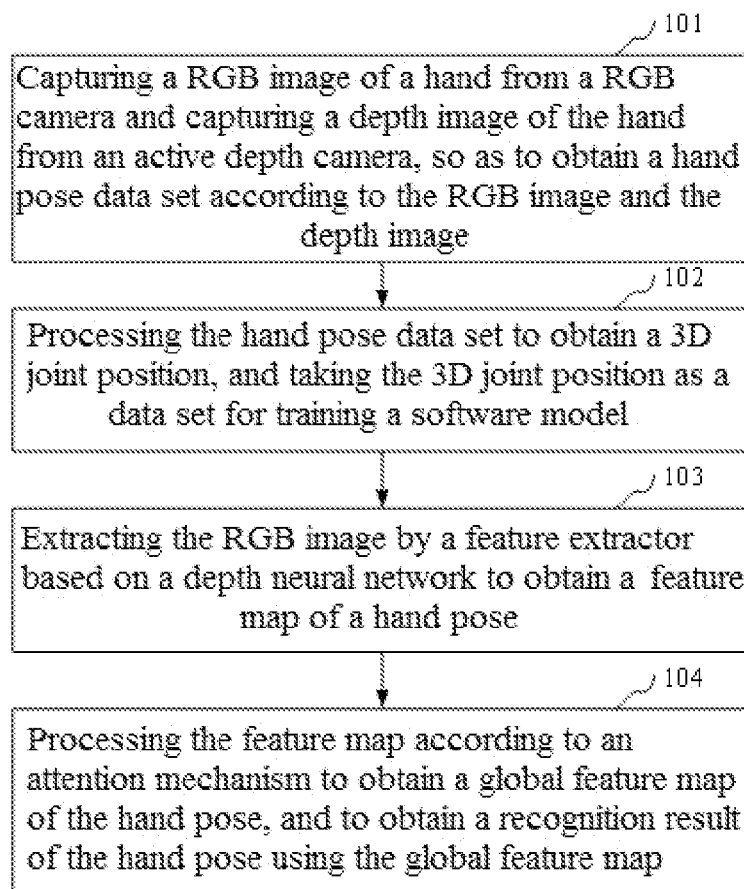
FIG. 1 is a flowchart of a method for hand pose recognition according to an embodiment.

In an embodiment, as shown in FIG. 1, a method for hand pose recognition is provided, which includes following steps 101 to 104.

In the step 101, a RGB image of a hand is captured from a RGB camera, a depth image of the hand is captured from an active depth camera, and a hand pose data set is obtained according to the RGB image and the depth image.

In the step 102, the hand pose data set is processed to obtain a 3D joint position, and the 3D joint position is taken as a data set for training a deep neural network model.

In the step 103, the RGB image is extracted by a feature extractor based on a depth neural network to obtain a feature map of a hand pose.

In the step 104, the feature map is processed according to an attention mechanism to obtain a global feature map of the hand pose, and to obtain a recognition result of the hand pose using the global feature map.

Specifically, hand pose estimation from the RGB images is always a difficult task, because of incompleteness of depth information. Accuracy of the hand pose estimation has been improved to a new height with a unique design of the InterNet, but there is still great potential. Based on architectures of a MobileNet v3 and MoGA network, a feature extractor is redesigned, which incorporates latest achievements in a field of computer vision, such as the ACON activation function and a new attention mechanism module, which are effectively applied to the network architecture. It can better extract global features of the RGB image of the hand, and provides greater performance improvement over the InterNet. It has achieved the state of the art on multiple data sets. We introduce a multi-spectral attention mechanism FcaLayer to process the obtained feature map before the fully connected network, so that it can retain more frequency domain information to improve its performance. We have improved overall training of the network and got more information from the available data. The recognition method not only provides good recognition accuracy, but also verifies effectivenesses of the coordinate attention mechanism module and the multispectral attention mechanism module in the feature extractor of the hand pose estimation network. Compared with related art, the coordinate attention mechanism is more excellent in improving the network performance. Regarding data acquisition of hand pose estimation, automatic or semi-automatic methods can be gradually used to replace manual labeling, and more accurate labeling by using a learning model such as the neural network contributes to reducing of workload burden caused by manual labeling.

Figure 2:
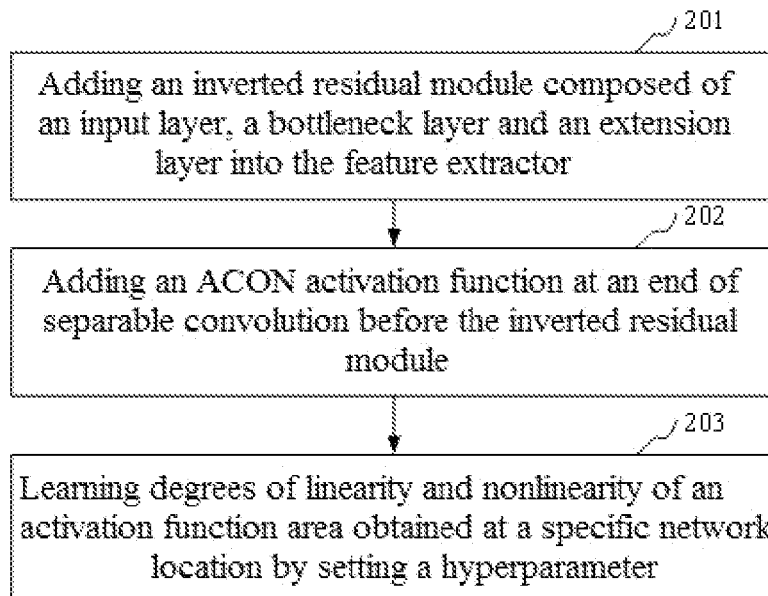
FIG. 2 is a flow chart of processing of a feature map by an inverted residual module according to an embodiment.

In an embodiment, as shown in FIG. 2, a process of processing the feature map by the inverted residual module includes following steps 201 and 203.

In the step 201, an inverted residual module composed of an input layer, a bottleneck layer and an extension layer is added into the feature extractor.

In the step 202, an ACON activation function is added at an end of separable convolution before the inverted residual module.

In the step 203, degrees of linearity and nonlinearity of an activation function area obtained at a specific network location can be learned by setting a hyperparameter.

Specifically, an inverted residual module is adopted in this embodiment. This module is also applied to a serial network of MobileNet v3 and MoGA. The inverted residual module is similar to a residual module, and is composed of an input layer, a bottleneck layer and an extension layer. In previous studies, it has been proved that the bottleneck layer actually contains all the necessary information, and the extension layer serves only as implementation details of nonlinear transformation of an adjoint tensor. A shortcut connection similar to a residual connection is directly inserted between bottleneck layers. Its design is different from that of the residual module. In practical applications, it is proved that it has higher memory efficiency and experimental effect over a traditional residual module. In this embodiment, an ACON activation function is proposed. Starting from a max function which defines maximum values of n parameters, its smooth and differentiable approximate function (smooth maximum) is determined. Inferring on this basis, it is proved that a swish function is a smooth approximation of a ReLU function. On this basis, in this embodiment, an ACON function family is built by imitating a ReLU function family, and degrees of linearity and nonlinearity of an activation function area at a specific network location can be learned by setting a hyperparameter, so as to be switched between activated and deactivated states. We add this activation function at the end of the separable convolution before the inverted residual module of the feature extractor, and get good results.

Figure 3:
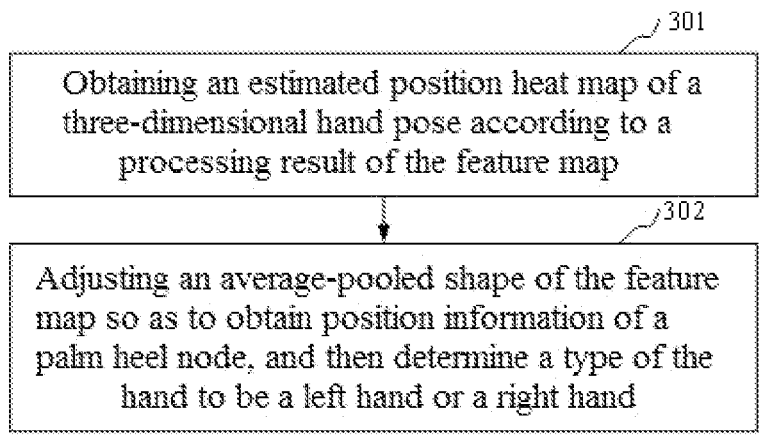
FIG. 3 is a flow chart of processing of a feature map by an attention mechanism module according to an embodiment.

In one embodiment, as shown in FIG. 3, a process of processing the feature map by the attention mechanism module includes following steps 301 and 302.

In the step 301, a coordinate attention mechanism module is introduced into the feature extractor, and the feature map is process according to the coordinate attention mechanism module to improve resolution and information completeness of the feature map.

In the step 302, a multispectral attention mechanism module is introduced into the feature extractor, and effectiveness of network feature extraction is estimated according to the multispectral attention mechanism module in the hand pose.

Specifically, in previous tasks of hand pose estimation, the attention mechanism module is rarely used. One reasons is that researches of the attention mechanism are still in a burgeoning stage, and many attention mechanisms such as spatial or frequency domain attention mechanisms have been proposed, which have not improved performance of the network in the tasks of hand pose estimation. Another reason is that the attention mechanism can serve to provide improving effect on some data sets, but provide little or even opposite effect on others ones. Through analysis of principles and continuous attempts of correct application in a network structure, we can add several types of attention mechanism modules to a network to act together and improve its performance on different data sets. Ablative analysis in the following test can prove effectiveness of our method. With the coordinate attention mechanism module being added, the accuracy of hand pose estimation can be improved, and it has better effect than an traditional spatial attention mechanism module. Since a hand target often occupies a small proportion of pixels compared with environmental background, there are many problems such as insufficient resolution and information incompleteness. Introduction of the attention mechanism can theoretically promote attention cognition and feature extraction of the target area by the network. In the previous works, the attention mechanism module was seldom used in hand pose estimation. We are aware of such vacancy in network design. Because of particularity of the task of hand pose estimation, we try to introduce the attention mechanism into the network to improve performance of the network. On a basis of good results of a module based on the coordinate attention mechanism, we try to preliminarily process the extracted feature map so as to facilitate higher-order operations. Meanwhile, we also verify effectiveness of the multispectral attention mechanism module in the feature extractor of the hand pose estimation network.

Figure 4:
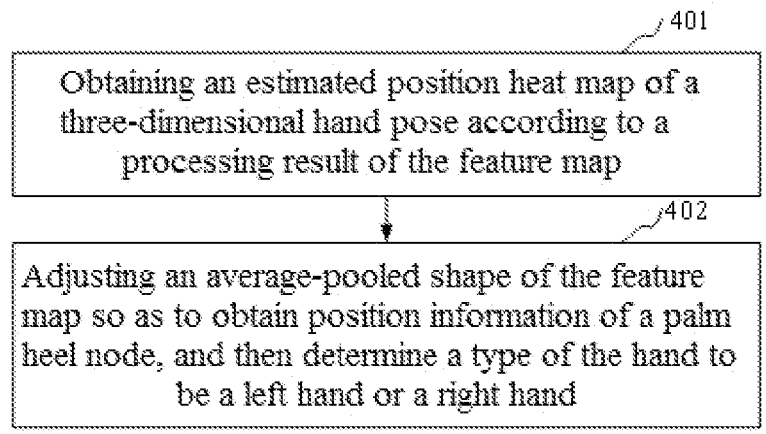
FIG. 4 is a flow chart of a global feature map recognition result according to an embodiment.

In an embodiment, as shown in FIG. 4, a process of obtaining the recognition result of the hand pose using the global feature map includes following steps 401 and 402.

In the step 401, an estimated position heat map of the three-dimensional hand pose is obtained according to a processing result of the feature map.

In the step 402, an average-pooled shape of the feature map is adjusted so as to obtain position information of a palm heel node, and then a type of the hand is determined to be a left hand or a right hand.

Specifically, after the feature map is obtained through the feature extractor, we didn't directly send it to a subsequent fully connected layer and linear structure to determine the hand to be the left or right and a number of hands in the image or to fit the position heat map of key nodes. Because the feature map is a three-dimensional tensor (in our network, with a size of 2048×8×8) with a number of channels much larger than the two-dimensional one, we use a new attention mechanism to process it so as to preserve as much information in frequency domain as possible before subsequent processing. Finally, the position heat map and hand position information are obtained according to the global feature map, so as to obtain a specific result of hand pose recognition.

It should be understood that although steps in the above flowchart are shown in sequence as indicated by arrows, these steps are not necessarily executed in sequence as indicated by arrows. Unless explicitly stated in this disclosure, there is no strict sequence restriction on execution of these steps, and these steps can be executed in other sequences. Moreover, at least a part of the steps in the above flowchart may include a plurality of sub-steps or stages, which are not necessarily completed at the same time, but can be executed at different times, and these sub-steps or stages is not necessarily executed in a sequential order, but can be alternately or alternatively executed with other steps or sub-steps of the other steps or at least a part of the stages.

Figure 5:
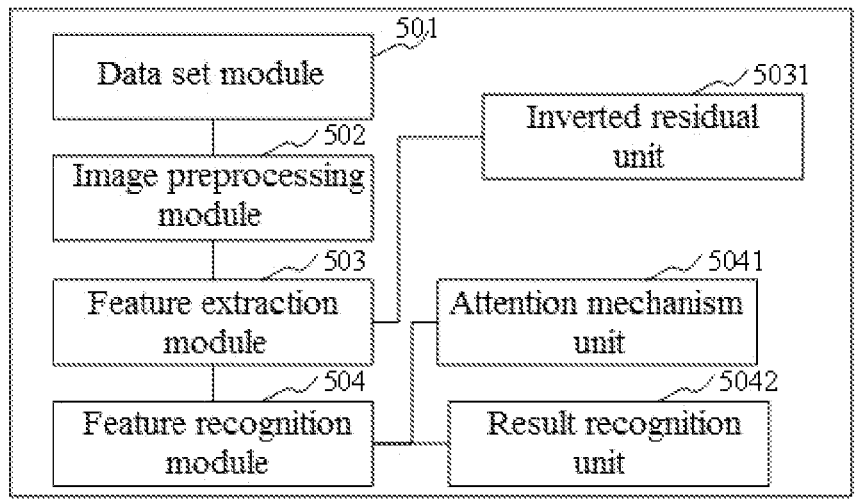
FIG. 5 is a structural block diagram of a system for hand pose recognition according to an embodiment.

In an embodiment, as shown in FIG. 5, a system for hand pose recognition is provided, which includes a data set module 501, image preprocessing module 502, a feature extraction module 503 and feature recognition module 504.

The data set module 501 is configured to capture a RGB image of a hand from a RGB camera and to capture a depth image of the hand from an active depth camera, so as to obtain a hand pose data set according to the RGB image and the depth image.

The image preprocessing module 502 is configured to process the hand pose data set to obtain a 3D joint position, and to take the 3D joint position as a data set for training a deep neural network model.

The feature extraction module 503 is configured to extract the RGB image by a feature extractor based on a depth neural network to obtain a feature map of a hand pose.

The feature recognition module 504 is configured to process the feature map according to an attention mechanism to obtain a global feature map of the hand pose, and to obtain a recognition result of the hand pose using the global feature map.

In an embodiment, as shown in FIG. 5, the feature map extraction module 503 includes an inverted residual unit 5031 configured to:
  add an inverted residual module composed of an input layer, a bottleneck layer and an extension layer into the feature extractor;
  add an ACON activation function at an end of separable convolution before the inverted residual module; and
  learn degrees of linearity and nonlinearity of an activation function area obtained at a specific network location by setting a hyperparameter.

In an embodiment, as shown in FIG. 5, the feature map recognition module 504 includes an attention mechanism unit 5041 configured to:
  introduce a coordinate attention mechanism module into the feature extractor, and process the feature map according to the coordinate attention mechanism module to improve resolution and information completeness of the feature map; and
  introduce a multispectral attention mechanism module into the feature extractor, and estimate effectiveness of network feature extraction according to the multispectral attention mechanism module in the hand pose.

In an embodiment, as shown in FIG. 5, the feature map recognition module 504 includes a result recognition unit 5042 configured to:
  obtain an estimated position heat map of the three-dimensional hand pose according to a processing result of the feature map; and
  adjust an average-pooled shape of the feature map so as to obtain position information of a palm heel node, and then determine a type of the hand to be a left hand or a right hand.

For specific definition of the system for hand pose recognition, reference can be made to above definition of the method for hand pose recognition, which will not be repeatedly described here. Respective modules in the above-mentioned system for hand pose recognition can be realized in whole or in part by software, hardware and combination thereof. Respective modules described above can be embedded in or independent of a processor in a device in a form of hardware, or stored in a memory in the device in a form of software, so that the processor can call and execute operations corresponding to the above modules.

Figure 6:
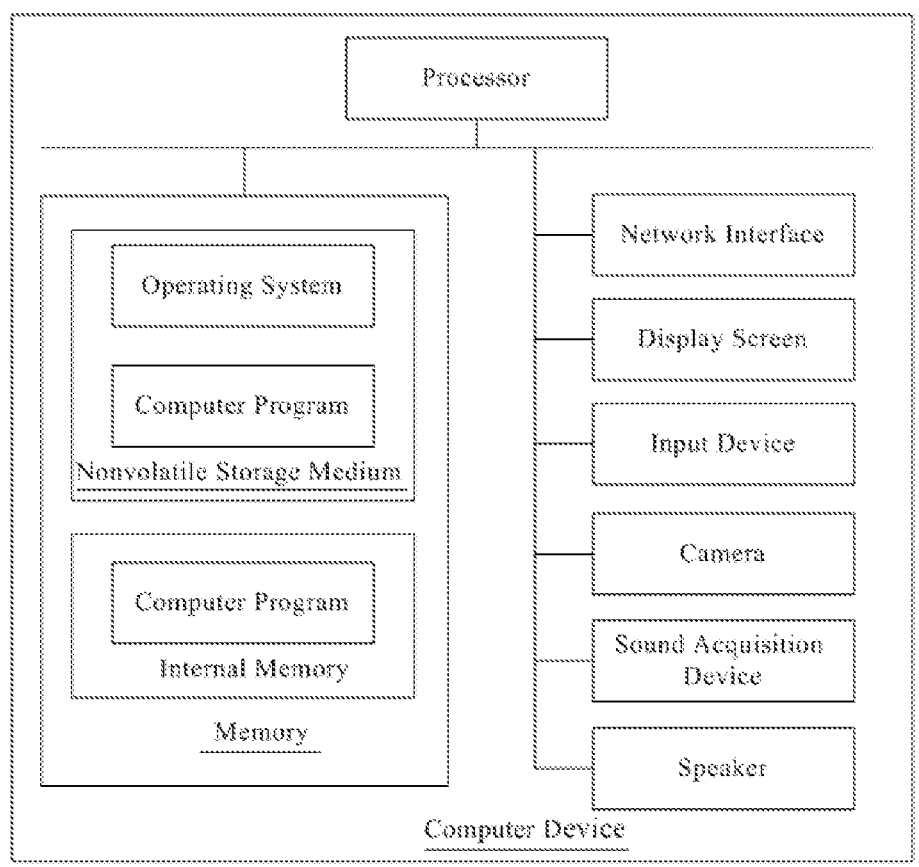
FIG. 6 is an internal structural diagram of a device according to an embodiment.

FIG. 6 shows an internal structural diagram of a device according to an embodiment. The device includes a processor, a memory, a network interface, an input device and a display screen which are connected through a system bus. The memory includes a nonvolatile storage medium and an internal memory. The non-volatile storage medium of the device stores an operating system, and can also store a computer program, which, when executed by the processor, can cause the processor to realize the method for hand pose recognition. The internal memory can also store a computer program, which, when executed by the processor, can cause the processor to execute the method for hand pose recognition. A display screen of the device can be a liquid crystal display screen or an electronic ink display screen, and the input device of the device can be a touch layer covered on the display screen, or a button, a trackball or a touch pad arranged on a shell of the device, or can be an external keyboard, touch pad or mouse.

It can be understood by those skilled in the art that the structure shown in FIG. 6 is only a block diagram of part of the structure related to schemes of this disclosure, and does not constitute a limitation on the device to which schemes of this disclosure are applied. The specific device may include more or less components than those shown in the figure, or combine some components or have a different component arrangement.

A computer device is further provided in an embodiment of the disclosure, as shown in FIG. 6, which includes a memory, a processor and a computer program stored on the memory and executable on the processor, and the processor implements following steps when executing the program.

A RGB image of a hand is captured from a RGB camera, a depth image of the hand is captured from an active depth camera, and a hand pose data set is obtained according to the RGB image and the depth image.

The hand pose data set is processed to obtain a 3D joint position, and the 3D joint position is taken as a data set for training a deep neural network model.

The RGB image is extracted by a feature extractor based on a depth neural network to obtain a feature map of a hand pose.

The feature map is processed according to an attention mechanism to obtain a global feature map of the hand pose, and to obtain a recognition result of the hand pose using the global feature map.

In an embodiment, the processor further implements following steps when executing the program.

An inverted residual module composed of an input layer, a bottleneck layer and an extension layer is added into the feature extractor.

An ACON activation function is added at an end of separable convolution before the inverted residual module.

Degrees of linearity and nonlinearity of an activation function area obtained at a specific network location can be learned by setting a hyperparameter.

In an embodiment, the processor further implements following steps when executing the program.

A coordinate attention mechanism module is introduced into the feature extractor, and the feature map is processed according to the coordinate attention mechanism module to improve resolution and information completeness of the feature map.

A multispectral attention mechanism module is introduced into the feature extractor, and effectiveness of network feature extraction is estimated according to the multispectral attention mechanism module in the hand pose.

In an embodiment, the processor further implements following steps when executing the program.

An estimated position heat map of the three-dimensional hand pose is obtained according to a processing result of the feature map.

An average-pooled shape of the feature map is adjusted so as to obtain position information of a palm heel node, and then a type of the hand is determined to be a left hand or a right hands.

In an embodiment, a computer-readable storage medium having a computer program stored thereon is provided in an embodiment of the present disclosure. Following steps are implemented when the program is executed by a processor.

A RGB image of a hand is captured from a RGB camera, a depth image of the hand is captured from an active depth camera, and a hand pose data set is obtained according to the RGB image and the depth image.

The hand pose data set is processed to obtain a 3D joint position, and the 3D joint position is taken as a data set for training a deep neural network model.

The RGB image is extracted by a feature extractor based on a depth neural network to obtain a feature map of a hand pose.

The feature map is processed according to an attention mechanism to obtain a global feature map of the hand pose, and to obtain a recognition result of the hand pose using the global feature map.

In an embodiment, the processor further implements following steps when executing the program.

An inverted residual module composed of an input layer, a bottleneck layer and an extension layer is added into the feature extractor.

An ACON activation function is added at an end of separable convolution before the inverted residual module.

Degrees of linearity and nonlinearity of an activation function area obtained at a specific network location are learnt by setting a hyperparameter.

In an embodiment, the processor further implements following steps when executing the program.

A coordinate attention mechanism module is introduced into the feature extractor, and the feature map is processed according to the coordinate attention mechanism module to improve resolution and information completeness of the feature map.

A multispectral attention mechanism module is introduced into the feature extractor, and effectiveness of network feature extraction is estimated according to the multispectral attention mechanism module in the hand pose.

In an embodiment, the processor further implements following steps when executing the program.

An estimated position heat map of the three-dimensional hand pose is obtained according to a processing result of the feature map.

An average-pooled shape of the feature map is adjusted so as to obtain position information of a palm heel node, and then a type of the hand is determined to be a left hand or a right hands.

It can be understood by those skilled in the art that all or part of the processes in the above-mentioned methods can be completed by instructing related hardware through computer programs, which can be stored in a non-volatile computer readable storage medium, and when executed, can include flowcharts of the embodiments of the methods described above.

The technical features of the above-mentioned embodiments can be combined in an arbitrary manner. For simplicity of description, not all of the possible combinations of the technical features in the embodiments described above are described, however, as long as there is no contradiction between these combinations of the technical features, the combinations should be considered as falling within the scope of this specification.

The above-mentioned embodiments only represent several embodiments of this disclosure, and their descriptions are specific and detailed, but they should not be understood as limiting the scope of this disclosure as such. It should be noted that, several modifications and improvements can be made for those of ordinary skill in the field without departing from the concept of this disclosure, which belong to the protection scope of this disclosure. Therefore, the protection scope of this disclosure shall be subjected to the appended claims.

What is claimed is:

1. A method for hand pose recognition, comprising:
capturing a RGB image of a hand from a RGB camera and capturing a depth image of the hand from an active depth camera, so as to obtain a hand pose data set according to the RGB image and the depth image;
processing the hand pose data set to obtain a 3D joint position, and taking the 3D joint position as a data set for training a software model;
extracting the RGB image by a feature extractor based on a depth neural network to obtain a feature map of a hand pose, which comprises: adding an inverted residual module composed of an input layer, a bottleneck layer and an extension layer into the feature extractor; adding an ACON activation function at an end of separable convolution before the inverted residual module; and learning degrees of linearity and nonlinearity of an activation function area obtained at a specific network location by setting a hyperparameter; and
processing the feature map according to an attention mechanism to obtain a global feature map of the hand pose, and to obtain a recognition result of the hand pose using the global feature map, which comprises: obtaining an estimated position heat map of a three-dimensional hand pose according to a processing result of the feature map; and adjusting an average-pooled shape of the feature map so as to obtain position information of a palm heel node, and then determine a type of the hand to be a left hand or a right hand;
wherein processing the feature map according to the attention mechanism to obtain the global feature map of the hand pose, and to obtain the recognition result of the hand pose using the global feature map comprises:
introducing a coordinate attention mechanism module into the feature extractor, and processing the feature map according to the coordinate attention mechanism module to improve resolution and information completeness of the feature map; and introducing a multispectral attention mechanism module into the feature extractor, and estimating effectiveness of network feature extraction according to the multispectral attention mechanism module in the hand pose.

2. A computer device, comprising a memory, a processor and a computer program stored on the memory and executable on the processor, wherein when the processor executes the computer program, steps of the method according to claim 1 are realized.

3. A non-transitory computer-readable storage medium having a computer program stored thereon, wherein the computer program, when executed by a processor, realizes steps of the method according to claim 1.

4. A system for hand pose recognition, comprising:

a data set module configured to capture a RGB image of a hand from a RGB camera and to capture a depth image of the hand from an active depth camera, so as to obtain a hand pose data set according to the RGB image and the depth image;

an image preprocessing module configured to process the hand pose data set to obtain a 3D joint position, and to take the 3D joint position as a data set for training a software model;

a feature extraction module configured to extract the RGB image by a feature extractor based on a depth neural network to obtain a feature map of a hand pose, a feature map extraction module comprising an inverted residual unit configured to: add an inverted residual module composed of an input layer, a bottleneck layer and an extension layer into the feature extractor; add an ACON activation function at an end of separable convolution before the inverted residual module; and learn degrees of linearity and nonlinearity of an activation function area obtained at a specific network location by setting a hyperparameter; and a feature recognition module configured to process the feature map according to an attention mechanism to obtain a global feature map of the hand pose, and to obtain a recognition result of the hand pose using the global feature map, the feature map recognition module comprising a result recognition unit configured to: obtain an estimated position heat map of a three-dimensional hand pose according to a processing result of the feature map; and adjust an average-pooled shape of the feature map so as to obtain position information of a palm heel node, and then determine a type of the hand to be a left hand or a right hand;

wherein the feature map recognition module comprises an attention mechanism unit configured to:

introduce a coordinate attention mechanism module into the feature extractor, and process the feature map according to the coordinate attention mechanism module to improve resolution and information completeness of the feature map; and introduce a multispectral attention mechanism module into the feature extractor, and estimate effectiveness of network feature extraction according to the multispectral attention mechanism module in the hand pose.

* * * * *